United States Patent

[11] 3,625,769

[72] Inventor Arthur E. Lyall
Bridgewater, N.J.
[21] Appl. No. 809,302
[22] Filed Mar. 21, 1969
[45] Patented Dec. 7, 1971
[73] Assignee Gulton Industries, Inc.
Metuchen, N.J.

[54] FUEL CELL
10 Claims, 3 Drawing Figs.

[52] U.S. Cl. .......... 136/86 A, 136/83, 136/153
[51] Int. Cl. .......... H01m 27/00
[50] Field of Search .......... 136/86, 153, 154, 6, 83

[56] References Cited

UNITED STATES PATENTS

| | | | |
|---|---|---|---|
| 2,921,110 | 1/1960 | Crowley et al. | 136/86 |
| 3,185,590 | 5/1965 | Mayer et al. | 136/6 |
| 3,393,093 | 7/1968 | Shaw et al. | 136/6 |

OTHER REFERENCES

Final Report by Hill and Selim, Aug. 15, 1965, page 29. NASA CR- 54880.

*Primary Examiner*—Winston A. Douglas
*Assistant Examiner*—H. A. Feeley
*Attorney*—Wallenstein, Spangenberg, Hattis & Strampel

ABSTRACT: A room-temperature-operated fuel cell comprising an oxygen electrode, a lithium metal-containing electrode, and an electrolyte comprising an inert, aprotic organic solvent, exemplified by dimethylsulfoxide, which contains an inorganic or organic ionizable salt sufficient in amount to attain saturation. The salt may, or may not, be an oxygen carrier. In those instances where a salt which is not an oxygen carrier is employed, lithium oxide initially is incorporated into the electrolyte.

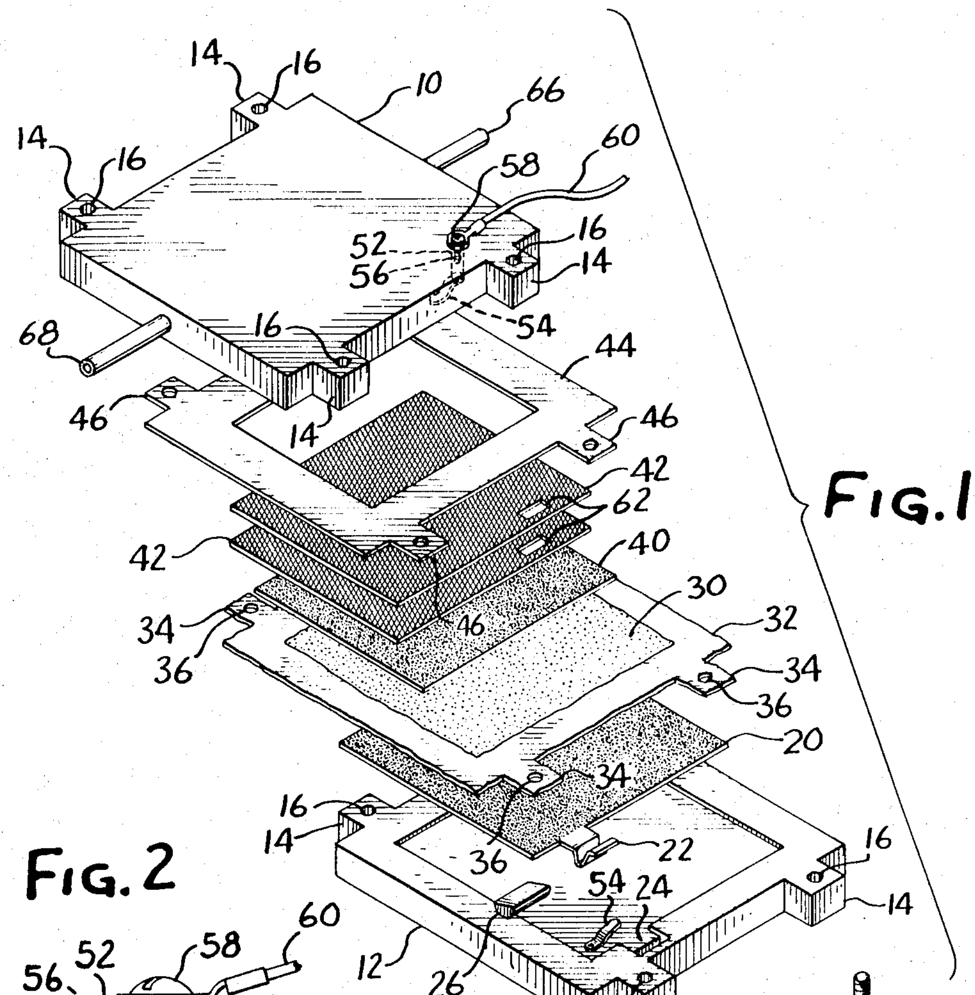
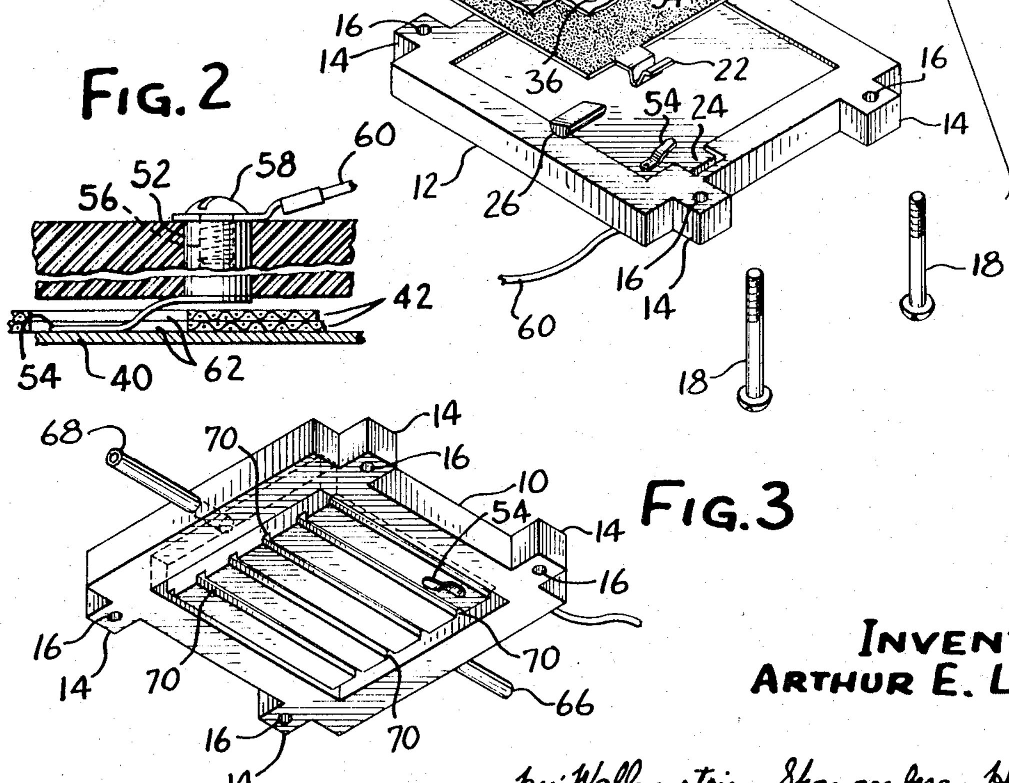
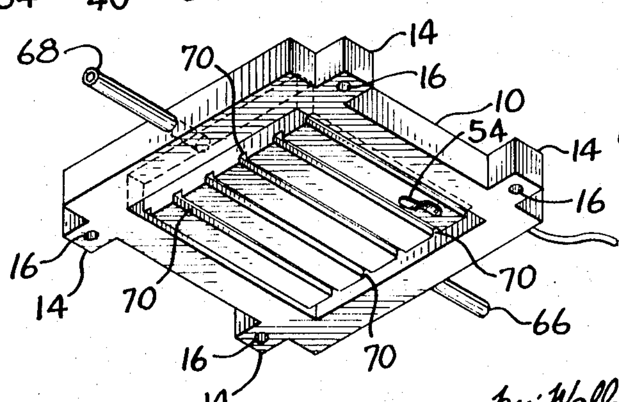
INVENTOR
ARTHUR E. LYALL
by: Wallenstein, Spangenberg, Hattis & Strampel
ATTYS.

FUEL CELL

The present invention is directed to a room-temperature-operated fuel cell, in particular, a room-temperature-operated fuel cell wherein the positive electrode is in the form of an oxygen electrode and the negative electrode contains lithium metal as an essential active ingredient.

In accordance with the present invention there is provided a fuel cell which, apart from its ability to operate at room or ambient temperature, is characterized in that it takes advantage of the lightweight and high chemical activity of lithium metal for its negative electrode, and advantageously utilizes in combination with such an electrode a standard oxygen electrode, as its positive electrode, whereby a low cost, relatively high energy density unit is attained which can be used in space vehicles as a power source, as well as in less sophisticated environs such as, for example, in telephone systems as an air-operable booster cell. The fuel cell of this invention is further characterized in that it employs nonaqueous electrolytes which are compatible with both the oxygen electrode and the lithium metal of the negative electrode, and which, furthermore, provide a low resistance path for the electrochemically active species in the cell and reduce polarization therein to low levels.

While the lithium electrode of the fuel cell of this invention may take various forms exemplified, for instance, by lithium foil supported on a gridlike carrier, in accordance with the preferred practice of the invention, the lithium electrode advantageously comprises a comminuted mixture of lithium powder and particles of permanently conductive material, in extensive electrical contact with the lithium, and held together by a binder on a grid support structure upon which the mixture is compacted. A lithium electrode thusly constituted is disclosed in copending U.S. application Ser. No. 669,802, filed Sept. 22, 1967. As described in said application, the lithium electrode is made by forming a slurry of lithium powder and particles of a conductive material such as silver, especially desirably, from an economic standpoint, nickel powder or degassed granular carbon, the lithium powder and the conductive material particles having a particle size no greater than about 100 mesh, and mixing it, in a vacuum or inert atmosphere, with an organic solvent solution of a binder such as polyethylene or carboxymethylcellulose. The mixture is then compacted on a grid support structure made of a conductive material exemplified by nickel, aluminum or iron, advantageously having an outer surface plated with a noble metal, and the resultant body is dried. As further disclosed in said application, an electrode having the desired properties is attained with a molar ratio of permanently conductive particles to lithium particles of at least about 1 to 9, and wherein the binder comprises no less than about 3 percent and no more than about 20 percent by bulk volume of the overall lithium-conductive particle-binder mixture.

As indicated, the fuel cell of the present invention advantageously utilizes, as the positive electrode, a standard oxygen electrode. Exemplary of such an electrode is one comprising a mixture of platinum and carbon which has been compacted on a platinum gauze support structure. Electrodes so constructed are available commercially under the designation "Cyanamid Type A" (American Cyanamid Co.).

The nonaqueous electrolytes used in the fuel cell of this invention comprise an organic solvent, especially desirably an aprotic dipolar solvent. Such solvents are characterized in that they maintain their liquid state over a wide temperature range, from below normal room temperature to above about 60° C., they are dipolar in that one part of the molecule has a more positive electrical charge relative to the other parts of the molecule thereby causing the molecule to act as a dipole, they are free of active hydrogen atoms or hydroxyl groups, and they are sufficiently inert not to enter into any deleterious side reactions in the cell either with the electrodes, the solutes, or the electrochemically active species of the cell. It is desirable, but not imperative, that the organic solvents also possess a dielectric constant of the order of 38, or greater, and that they have a viscosity at room temperature less than 3 c.p.s. A mixture of solvents satisfying the foregoing criteria can, of course, be employed.

Exemplary of organic solvents which have been found to be highly advantageous for use in the fuel cells of the present invention are cyclic ethers such as morpholine, dioxane, dimethyl gamma pyrone and gamma butyrolactone; alkylene carbonates, exemplified by ethylene carbonate and propylene carbonate; alkyl pyrrolidones specific examples of which are N-methyl-2-pyrrolidone, and N-ethyl-2-pyrrolidone; sulfoxides such as dimethylsulfoxide and diethylsulfoxide; alkyl amides including N, N-diethylformamide, N, N-dimethylacetamide and N, N-diethyl-acetamide; alkylphosphoramides and arylphosphoramides exemplified by hexamethylphosphoramide, hexaethylphosphoramide and hexaphenylphosphoramide; nitriles such as acetonitrile and benzonitrile; nitro-alkanes examples of which are nitromethane and nitroethane; and the like; and compatible mixtures thereof.

The inorganic and organic salts which comprise the solute of the electrolytes having utility in the fuel cells of the present invention are characterized in that they are adequately soluble in the above-disclosed organic solvents, they are ionizable in said solvents, and they are compatible with the solvents and the electrodes of the cell. The salts further are characterized in that they act to reduce the resistivity of the electrolyte, that is, they enhance the electron transfer capabilities of the electrolyte. The salts may, or may not, be oxygen carriers. In those instances where a salt which is not an oxygen carrier is employed, lithium oxide initially is incorporated into the organic solvent solution of the salt.

Exemplary of salts, which broadly may be characterized as oxygen carriers, having utility for the purposes of the present invention are alkali and alkaline earth metal salts such as potassium nitrate, sodium nitrate, lithium nitrate, lithium chlorate, potassium chlorate, rubidium chlorate, magnesium chlorate, lithium perchlorate, potassium perchlorate, potassium chromate, sodium chromate, and the like, and alkali metallike salts exemplified by ammonium dichromate and ammonium nitrate. Of this group, the alkali and alkaline earth metal nitrates, chlorates, perchlorates and chromates are especially preferred solutes.

Exemplary of salts, which broadly may be characterized as nonoxygen carriers, useful as solutes are alkali metal thiocyanates specific examples of which are sodium thiocyanate, potassium thiocyanate and lithium thiocyanate, and ionizable organic salts exemplified by alkyl-, aryl-, and alkylaryl-oxonium, sulfonium and phosphonium slats such as dimethyl oxonium hydrochloride, diethyl oxonium hydrochloride, dimethyl oxonium hydrobromide, methyl-phenyl oxonium hydrochloride, diphenyl oxonium hydrochloride, trimethyl sulfonium chloride, trimethyl sulfonium bromide, trimethyl sulfonium iodide, triethyl sulfonium chloride, dimethyl-phenyl sulfonium chloride, diethylphenyl sulfonium chloride, triphenyl sulfonium chloride, tetramethyl phosphonium chloride, tetra-methyl phosphonium iodide, tetraethyl phosphonium chloride, dimethyl-diphenyl phosphonium chloride, diethyl-diphenyl phosphonium chloride, tetra-phenyl phosphonium chloride, and the like. Of the foregoing organic salts, the lower alkyl salts are preferred because they impart more desirable viscosity properties to the electrolytes.

The concentration of the solute in the organic solvent should be sufficient to provide maximum conductivity conditions in the electrolyte. To this end, the solute advantageously is added to the solvent in an amount adequate, or nearly so, to effect saturation of the solvent with the solute. In those instances where the solute utilized is a nonoxygen carrier, as described hereinabove, lithium oxide desirably is initially incorporated in the solvent in an amount sufficient to saturate the solvent with it.

Referring now to the drawing, in FIG. 1 there is shown an exploded view of an embodiment of the fuel cell of this invention. As illustrated, the cell comprises a faceplate 10 and a backup plate 12. The plates 10 and 12 advantageously are fabricated of a chemical-resistant plastic material such as polypropylene. The plates are provided with a pair of extensions 14—14 on opposite sides thereof which have a bore 16 therethrough for receiving bolts 18—18 for securing the plates, and the other components of the cell, together in air-tight, leakproof relation.

The backup plate 12 is adapted to receive and support a lithium electrode 20, desirably fabricated as described in said aforementioned copending application Ser. No. 669,802. The electrode 20, as shown, has a V-shaped extension 22 which is received in a slot 24 formed in the inner side wall of the plate 12, and is locked therein by means of a key 26.

Superimposed on the lithium electrode 20 is a separator 30 provided with a peripheral envelope 32. The separator advantageously is formed of an absorbent material such as teflon-fiberglass cloth, nonwoven polypropylene, asbestos, or the like, and is saturated with an electrolyte of the type described herein. The envelope 32, on the other hand, is formed of a nonabsorbent material such as fused polypropylene or neoprene, and acts as a barrier around the periphery of the separator 30 to prevent migration of the electrolyte. The envelope 32, as shown, has a pair of extensions 34—34 on opposite sides thereof, each of which is provided with an opening 36 therethrough for receiving the bolts 18—18.

Overlying, and in contact with, the separator 30 is an oxygen electrode 40. The electrode 40 may be of a standard type which, as stated hereinabove, comprises a mixture of platinum and carbon compacted on platinum gauze. Positioned on the oxygen electrode 40 are a pair of spacer screens 42—42 desirably made of an inert material such as polypropylene or neoprene. A gasket 44, made of neoprene, for example, is located between the spacer screens 42—42 and the faceplate 10. The gasket 44 has a pair of extensions 46—46 on opposite sides thereof each of which has an opening 48 therethrough for receiving the bolts 18—18.

The faceplate 10 and the backup plate 12 function as current collectors. While various means may be utilized to enable the plates to serve this function, as illustrated in an enlarged sectional view in FIG. 2 of the drawing, this is achieved in the embodiment shown by providing each of the plates with a metal plug or sleeve 52 to the base of which is secured a leaf spring 54. The plugs or sleeves 52 each have a threaded bore 56 for receiving screws 58—58 for securing lead wires 60—60 to the plates. The spring 54 on the face plate 10 makes contact with the oxygen electrode 40 through slits 62—62 in the spacer screens 42, while the spring 54 on the backup plate 12 engages the lithium electrode 20.

As shown in FIG. 3 of the drawing, the faceplate 10 has an inlet 66 for oxygen, or an oxygen-containing gas, and an outlet 68. The inner wall of the plate 10 is provided with a plurality of channels 70 whereby oxygen admitted through the inlet 66 is directed to the oxygen electrode 40. In those instances where air is used as the source of oxygen for the cell, a carbon dioxide and water filter (not shown) advantageously are connected to the inlet 66 of the cell.

By way of illustration, a fuel cell, constructed as described hereinabove, utilizing pure oxygen and an electrolyte comprising propylene carbonate saturated with magnesium perchlorate, yields a voltage of 2.90 volts at a current density of 0.1 ma./cm.$^2$ The same cell yields a voltage of 2.20 volts at a current density of 1.0 ma./cm.$^2$ It should be understood that various modifications may be made in the embodiment of the invention described above without deviating from the broader aspects of the invention.

What is claimed is:

1. A room temperature operated oxygen-fed fuel cell comprising a positive electrode in the form of an oxygen electrode, a negative electrode containing lithium metal as an essential active ingredient, a nonaqueous electrolyte comprising an inert aprotic organic solvent, lithium oxide in an amount sufficient to substantially saturate the organic solvent, and an ionizable, nonoxygen-carrying salt which is capable in the electrolyte of reducing the resistivity thereof, and means for contacting the oxygen electrode with oxygen.

2. A fuel cell according to claim 1 wherein the lithium electrode comprises a grid support upon which there is supported a compacted comminuted mixture containing, as essential ingredients, active powdered lithium metal and particles of a permanently conductive material in extensive intimate electrical contact with the powdered lithium, the lithium particles and the particles of conductive material being held together and to the grid support by a minor proportion of an inert binder distributed throughout the mixture.

3. A fuel cell according to claim 1 wherein the ionizable nonoxygen-carrying inorganic salts are alkali and alkaline earth metal thiocyanates.

4. A fuel cell according to claim 1 wherein the ionizable nonoxygen-carrying organic salts are alkyl, aryl, or alkylaryl oxonium, sulfonium or phosphonium salts.

5. A fuel cell according to claim 1 wherein the electrolyte is carried on an absorbent material which is provided with a liquid barrier at the periphery thereof.

6. A fuel cell according to claim 1 wherein the cell has a pair of current collectors one of which is adapted to direct oxygen, or an oxygen-containing gas, to the oxygen electrode.

7. A fuel cell according to claim 9 wherein the other current collector supports the lithium electrode.

8. A fuel cell according to claim 9 wherein the current collectors are each provided with electrode contact means which is connectable to a current-carrying lead.

9. A fuel cell according to claim 1 wherein the organic solvent is propylene carbonate.

10. A fuel cell according to claim 4 wherein the inert aprotic solvent is dimethyl-gamma-pyrone.

* * * * *